United States Patent
Eberts et al.

(10) Patent No.: US 11,685,301 B2
(45) Date of Patent: Jun. 27, 2023

(54) CARGO CONTAINERS AND METHODS OF USING THEREOF FOR DELIVERIES USING MULTIPLE DIFFERENT TYPES OF TRUCKS

(71) Applicant: Harbinger Motors Inc., Gardena, CA (US)

(72) Inventors: William Clarke Eberts, Los Angeles, CA (US); John Henry Harris, III, Anaheim, CA (US); Phillip John Weicker, Los Angeles, CA (US)

(73) Assignee: Harbinger Motors Inc., Gardena, CA (US)

( * ) Notice: Subject to any disclaimer, the term of this patent is extended or adjusted under 35 U.S.C. 154(b) by 0 days.

(21) Appl. No.: 17/655,197

(22) Filed: Mar. 17, 2022

(65) Prior Publication Data

US 2023/0122078 A1 Apr. 20, 2023

Related U.S. Application Data

(60) Provisional application No. 63/257,447, filed on Oct. 19, 2021.

(51) Int. Cl.
*B60P 1/64* (2006.01)
*B60P 1/52* (2006.01)
*B60P 7/13* (2006.01)

(52) U.S. Cl.
CPC ............ *B60P 1/6436* (2013.01); *B60P 1/52* (2013.01); *B60P 1/6427* (2013.01); *B60P 1/6481* (2013.01); *B60P 7/13* (2013.01)

(58) Field of Classification Search
CPC ......... B60P 1/52; B60P 1/6409; B60P 1/6427; B60P 1/6436; B60P 1/6481; B60P 1/02

USPC .......................................................... 414/679
See application file for complete search history.

(56) References Cited

U.S. PATENT DOCUMENTS

| 2,127,482 A * | 8/1938 | Fitch ..................... B60P 1/6427 414/499 |
| 2,691,450 A * | 10/1954 | Rosenbaum .......... B60P 1/6436 414/343 |
| 3,168,959 A * | 2/1965 | Chandler ............... B60P 1/6454 414/500 |

(Continued)

FOREIGN PATENT DOCUMENTS

| EP | 0446388 A1 * | 9/1991 | ............ B60P 1/6436 |
| EP | 3219541 A1 * | 9/2017 | ................ B60P 1/02 |

(Continued)

*Primary Examiner* — James Keenan
(74) *Attorney, Agent, or Firm* — Polygon IP, LLP

(57) ABSTRACT

Described herein are systems and methods for using different truck types for deliveries. A package is initially loaded into a specially configured cargo container that can be transported either on a primary truck or a secondary truck. A secondary truck is smaller than a primary truck and is configured to transport fewer cargo containers than the primary truck. An initial leg of the overall delivery (e.g., from a warehouse to a transfer point) is performed using a primary truck. The cargo container is then transferred to a secondary truck, which completes the delivery. Empty cargo containers can be transferred back to a primary truck, e.g., in a stacked or folded manner, for transporting back to the warehouse. The configurations of primary and secondary trucks are such that these transfers can occur at any location (e.g., a parking lot) with minimal human involvement.

20 Claims, 16 Drawing Sheets

(56) References Cited

U.S. PATENT DOCUMENTS

| | | | | |
|---|---|---|---|---|
| 3,486,645 A * | 12/1969 | Hearn | ............... | B60P 1/5428 414/339 |
| 3,612,315 A * | 10/1971 | Blackburn | ............ | B60P 1/6427 414/498 |
| 3,765,692 A * | 10/1973 | Barber | ............... | B60G 17/019 280/6.151 |
| 4,051,959 A * | 10/1977 | Staff | ............... | B60P 1/025 414/400 |
| RE32,736 E * | 8/1988 | Lovell | ............... | B60G 5/00 180/41 |
| 5,417,540 A * | 5/1995 | Cox | ............... | B60P 1/6427 414/537 |
| 5,467,827 A * | 11/1995 | McLoughlin | ......... | B60P 1/6427 414/535 |
| 5,662,450 A * | 9/1997 | Roberts | ............... | B60P 1/6481 414/679 |
| 5,700,026 A * | 12/1997 | Zalewski | ............ | B60G 21/051 280/6.151 |
| 6,622,846 B1 * | 9/2003 | Dean | ............... | B60P 1/52 414/529 |
| 9,944,458 B2 * | 4/2018 | Bowser | ............... | B60P 1/6481 |
| 10,449,886 B2 * | 10/2019 | Richardson | ............... | B60P 1/38 |
| 2022/0084340 A1 * | 3/2022 | Hall | ............... | B60P 1/5428 |
| 2022/0194627 A1 * | 6/2022 | Morikami | ............... | B60P 1/44 |

FOREIGN PATENT DOCUMENTS

| | | | | |
|---|---|---|---|---|
| JP | 58012845 A | * | 1/1983 | ............ B60P 1/6427 |
| WO | WO-9318934 A1 | * | 9/1993 | ............ B60P 1/6463 |

* cited by examiner

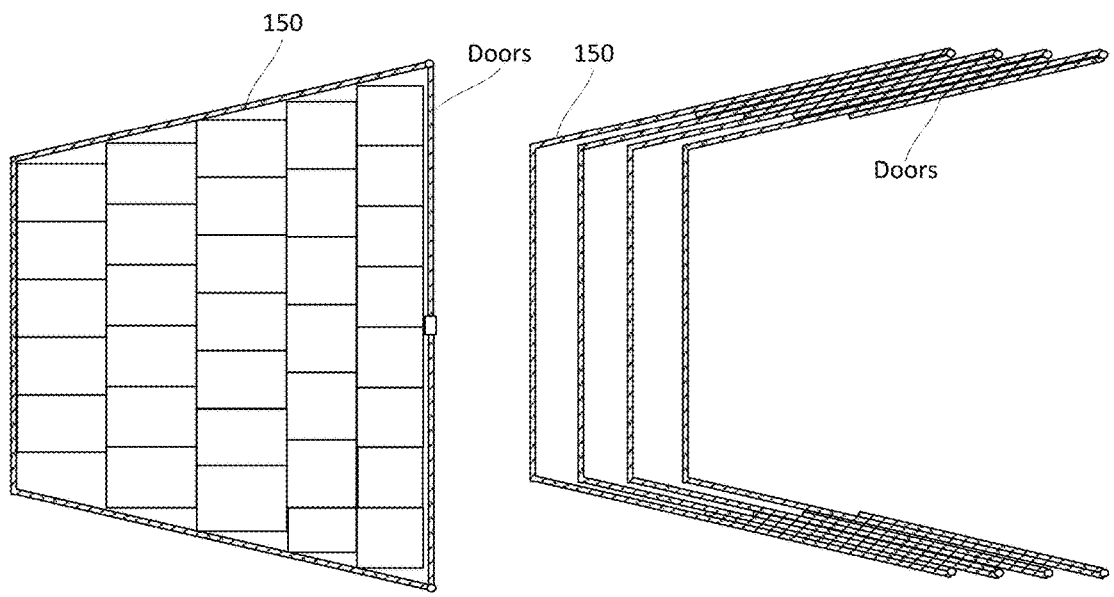
FIG. 3A
FIG. 3B
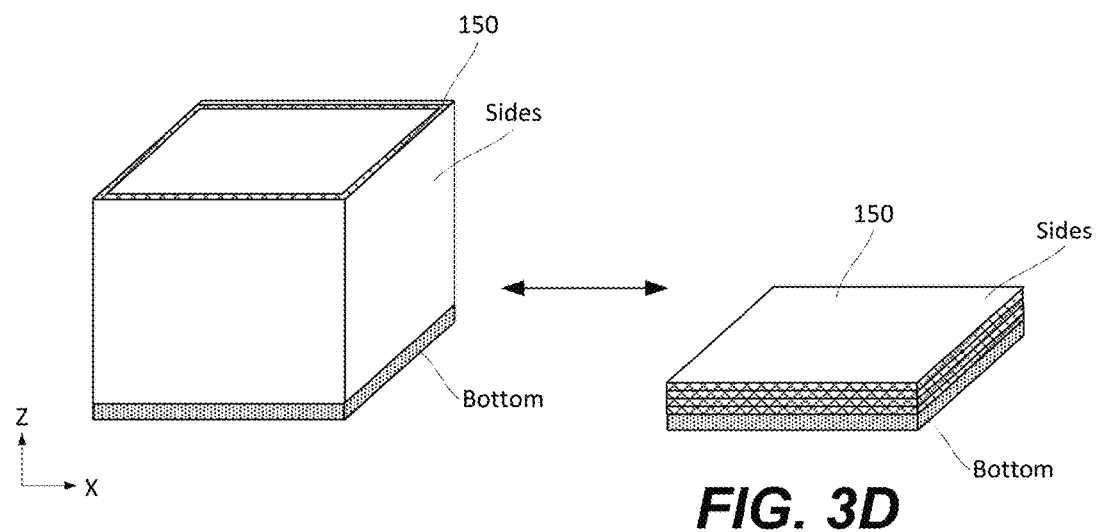
FIG. 3C
FIG. 3D

CARGO CONTAINERS AND METHODS OF USING THEREOF FOR DELIVERIES USING MULTIPLE DIFFERENT TYPES OF TRUCKS

CROSS-REFERENCE TO RELATED APPLICATIONS

This application claims the benefit under 35 U.S.C. § 119(e) of U.S. Provisional Patent Application No. 63/257,447, filed on 2021 Oct. 19, which is incorporated herein by reference in its entirety for all purposes.

BACKGROUND

Package deliveries have many challenges including high costs, route planning difficulties, vehicle restrictions, and the like. For example, large warehouses are typically positioned away from urban areas where most of the final deliveries occur to respective end customers. Driving multiple small delivery trucks (e.g., Class 2-4) from these large warehouses to end customers can be inefficient due to long distances, traffic, time, and the number of drivers required to drive many vehicles. On the other hand, using large trucks (e.g., Class 6-8) is not efficient for delivering small packages to many different customers (e.g., individual parcels).

SUMMARY

Described herein are systems and methods for using different truck types for deliveries. A package is initially loaded into a specially configured cargo container that can be transported either on a primary truck or a secondary truck. A secondary truck is smaller than a primary truck and is configured to transport fewer cargo containers than the primary truck. Each cargo container is sized based on the maximum allowable dimensions for the primary truck and, separately, for the secondary trucks thereby ensuring the maximum container capacity. An initial leg of the overall delivery (e.g., from a warehouse to a transfer point) is performed using a primary truck. The cargo container is then transferred to a secondary truck, which completes the delivery to end customers. Empty cargo containers can be transferred back to a primary truck, e.g., in a stacked or folded manner, for transporting back to the warehouse. The configurations of primary and secondary trucks are such that these transfers can occur at any location (e.g., a parking lot) with minimal human involvement. For example, cargo containers and/or trucks can be equipped with rotatable container supports that enable rolling the cargo containers from one truck to another.

These and other embodiments are described further below with reference to the figures.

BRIEF DESCRIPTION OF THE DRAWINGS

FIG. 3A is a schematic illustration of a stackable cargo container, in accordance with some examples.

FIG. 3B is a schematic illustration of four stacked cargo containers, in accordance with some examples.

FIG. 3C is a schematic illustration of a collapsible cargo container in an expanded state, in accordance with some examples.

FIG. 3D is a schematic illustration of the collapsible cargo container of FIG. 3C in a collapsed state, in accordance with some examples.

DETAILED DESCRIPTION

Figure 1A:
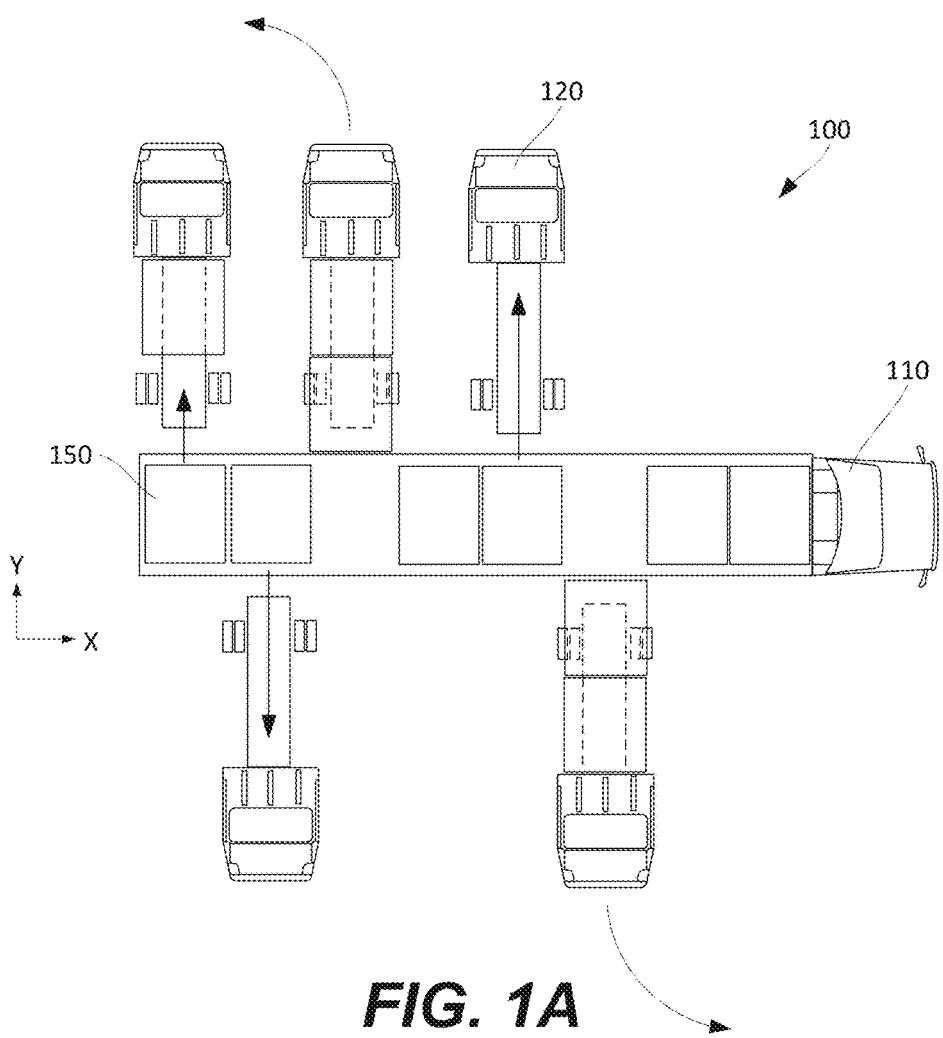
FIG. 1A is an example of a cargo-container transport system with cargo containers being transferred from a primary truck to multiple secondary trucks, positioned on both sides of the primary truck.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

As noted above, package deliveries have many challenges caused by warehouse and final delivery locations, package sizes, and the like. Cargo-container transport systems and methods of using such systems, described herein, address these challenges by using specially configured cargo containers and different types of delivery trucks, e.g., primary trucks and secondary trucks. Primary trucks are used for the first leg of the overall delivery process, while secondary trucks are used for the remaining delivery leg and, in some examples, for the final delivery. Each cargo container is specially sized based on the maximum allowable dimensions for the primary truck and, separately, based on the maximum allowable dimensions for the secondary trucks thereby ensuring the maximum container capacity. Furthermore, the containers are configured for fast and efficient transfer of these cargo containers between these different truck types. For example, a primary truck is configured to carry a larger number of cargo containers than a secondary truck. Primary trucks are used for an initial leg of the overall delivery (e.g., from a warehouse to a transfer point). The cargo containers are then transferred from these primary trucks to secondary trucks, which complete the remaining leg of the delivery.

These described methods and systems reduce or eliminate the expenditure of labor at the distribution locations associated with the transfer of packages or cargo from primary trucks to secondary trucks in comparison to conventional methods wherein each package is handled individually. Furthermore, these methods and systems maximize the amount of labor performed at the primary warehouse location (e.g., sorting packages, allocating packages to specific cargo containers, and even specifically positioning individual packages inside cargo containers based on the secondary trucks' delivery routes. Specifically, this package allocation and positioning reduce the time required by the delivery drivers to locate and remove each package from the secondary truck. Various new automation processes and capital investment can then be focused at primary warehouse locations, e.g., automated package sorting equipment for loading cargo containers. It should be noted that the use of these described methods and systems allows leveraging this single-point automation (e.g., at one primary warehouse) across multiple distribution centers.

These methods and systems also provide major efficiency across the entire package delivery vertical. For example, automated package sorting equipment can be deployed at primary warehouses and operate continuously (e.g., 24 hours a day) to pre-pack cargo containers. These cargo containers are then queued up to be loaded onto primary vehicles during the acceptable delivery windows, which are typically less than 24 hours a day (e.g., to avoid night deliveries and other delivery restrictions). Furthermore, additional efficiencies are realized by pushing certain tasks (e.g., package presorting within cargo containers) upstream. In general, tasks performed at the warehouse are more efficient due to the economies of scale and possible automation than similar tasks in the field (e.g., finding a package in a fully loaded delivery vehicle). Furthermore, many warehouse operations require less qualification (e.g., no driving experience), have higher productivity (e.g., due to specialization, more effective workplace, environmental controls).

Furthermore, the sizing of cargo containers is specifically selected to maximize the utilization of two different types (e.g., sizes and classes) of the trucks, such as primary trucks and secondary trucks. The cargo containers are specifically designed to be used on particular trucks or, more specifically, on particular two types of trucks. For example, while conventional 20-foot containers and 40-foot containers can be transported on larger (Class 8) trucks, these containers are not suitable for final delivery as these containers are too large for smaller delivery vehicles and can not be easily transferred from one vehicle to another vehicle (e.g., being rolled by a human). At the same time, many smaller containers are typically not designed for specific trucks with most being transported inside enclosed trailers and box trucks. This approach makes the process of loading, unloading, and transferring such containers very labor-intensive. Furthermore, once these smaller containers are loaded into enclosed trailers and box trucks, access to these containers is very limited. A container typically has to be removed from the truck to access the contents of this container. As a result of these limitations, containers are typically not used for delivery. Instead, cargo vans and small box trucks are typically loaded by hand with individual packages and these packages are then found and retrieved by the delivery driver.

The specific designs of cargo containers, primary trucks, and secondary trucks address these issues by securing cargo containers on primary truck beds and secondary truck beds without a need for any external enclosures for these containers. As such, cargo containers can be loaded to primary and secondary trucks from any side. Furthermore, cargo containers can be easily accessible (from multiple sides) while secured on secondary trucks, which can be used to access and remove packages during the delivery.

For purposes of this disclosure, the transport of packages from a primary warehouse to a distribution lot, or the transport from one primary warehouse to another primary warehouse is referred to as "middle-mile" delivery. One specific example is transporting cargo containers on a primary truck and then transferring these cargo containers to multiple secondary trucks. Other examples include transporting cargo containers on a primary truck between two primary warehouses and transporting cargo containers on a primary truck to another primary truck. "Last-mile" delivery is defined as the actual package delivery, e.g., a package being transported on a secondary truck inside a cargo container to the final delivery recipient. It should be noted that the last-mile delivery also involves the removal of packages from the cargo container, e.g., by the secondary truck driver.

The initial delivery leg (traveled by each primary truck) may correspond to a longer distance than the average of the remaining delivery leg (the average traveling distance of the secondary trucks). Furthermore, the initial delivery leg (performed by a primary truck) has fewer stops than secondary trucks. For example, a primary truck brings multiple cargo containers to one or more transfer points, at which these cargo containers are transferred to the secondary trucks. On other hand, each of the remaining deliveries (performed by secondary trucks) has multiple stops (e.g., to each package stop) often on small streets and tight spaces, not suitable for large primary trucks. As a result, primary trucks are more efficient for the initial delivery leg, while secondary trucks are more efficient for the remaining delivery leg.

Examples of Cargo-Container Transport Systems

FIG. 1A is one example of cargo-container transport system 100 with cargo containers 150 being transferred from primary truck 110 to multiple secondary trucks 120. In this example, each secondary truck 120 is positioned perpendicular to primary truck 110. More specifically, primary truck 110 is lined up along the X-axis shown in FIG. 1A, while each of secondary trucks 120 is lined up along the Y-axis. This orientation allows aligning multiple secondary trucks 120 relative to the same primary truck 110. Furthermore, secondary trucks 120 may be positioned on different sides of primary truck 110. For example, FIG. 1A illustrates three secondary trucks 120 positioned on the left side of primary truck 110 and two secondary trucks 120 positioned on the right side. This approach allows simultaneous transfer of two adjacent cargo containers 150, e.g., one container to secondary truck 120 on the left side of primary truck 110 and the other container to secondary truck 120 on the left side. It should be noted that the size and weight of cargo containers 150 may be such that the transfer (between trucks) can be performed by people (e.g., delivery drivers) without any additional equipment. As further described below, cargo containers 150 can be equipped with rotatable container supports and/or other features enabling this transfer.

Figure 1B:
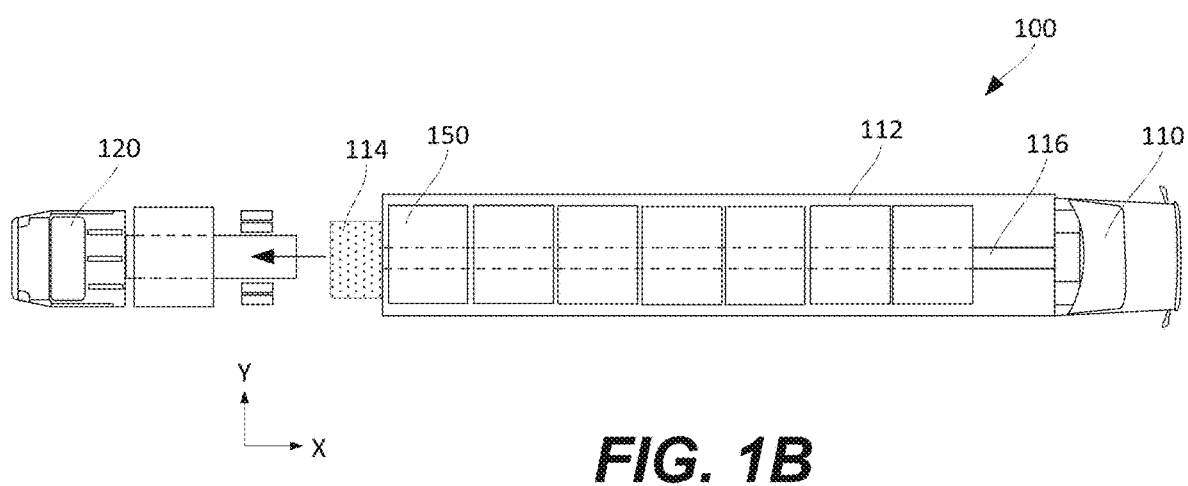
FIG. 1B is another example of a cargo-container transport system with cargo containers being transferred from a primary truck to a secondary truck, axially aligned with the primary truck.

FIG. 1B is another example of cargo-container transport system 100 with cargo containers 150 being transferred from primary truck 110 to secondary truck 120. In this example, secondary truck 120 is aligned with primary truck 110 along the same axis (e.g., along the X-axis shown in FIG. 1A) in a back-to-back configuration. This container-transfer orientation can help to simplify the design of secondary truck 120. For example, secondary truck 120 can have a lower fixed platform related to the platform of primary truck 110. Primary truck 110 can be equipped with transfer device 114 (e.g., a vertically movable platform). While transferring cargo containers 150 from primary truck 110 to secondary truck 120, each cargo container 150 is rolled to transfer device 114, which then adjusts the vertical position of cargo container 150. Cargo container 150 is then rolled to secondary truck 120. In some examples, primary truck 110 can be equipped with container-positioning device 116 for changing the position of cargo containers 150 on primary truck bed 112. Secondary trucks 120 can be equipped with similar devices.

Primary truck 110 and secondary truck 120 may be configured to transport a different number of cargo containers 150. Specifically, primary truck 110 is configured to transport more containers than each secondary truck 120. FIG. 1A illustrates an example in which primary truck 110 is configured to transport eight cargo containers 150, while each secondary truck 120 is configured to transport two cargo containers 150. Other examples are within the scope, e.g., where secondary truck 120 is configured to transport only one cargo container 150 or three or more cargo containers 150. For example, cargo container 150 can be 8-foot wide and 4-foot long. A 20-foot secondary truck can transport 5 cargo containers of this size, e.g., positioned in a single row. While smaller containers are lighter and easier to move, the number of transfer operations (e.g., from primary trucks to secondary trucks) also increases. As noted above, cargo containers 150 can be sized to ensure maximum utilization of each type of truck, e.g., sized based on the maximum allowable dimensions for each primary truck 110 and further based on the maximum allowable dimensions for each secondary truck 120. Furthermore, in some examples, cargo containers 150 can be sized to ensure that a person (or multiple people) can roll each container when transferring cargo containers 150 between trucks.

The configurational differences between primary truck 110 and secondary truck 120 improve the overall delivery efficiency. Specifically, primary truck 110 has a much more direct route than each secondary truck 120. For example, primary truck 110 transports all cargo containers from a warehouse to the same location where all containers are transferred to secondary trucks 120, e.g., either directly from one truck to another or indirectly (by positioning containers onto an intermediate structure/ground). This location may be referred to as a transfer location. In some examples, primary truck 110 has multiple transferred locations along its route, e.g., up to the number of cargo containers 150 on primary truck 110. In other words, the primary truck route has fewer stops than the secondary truck route (e.g., at least 2-times fewer stops, at least 5-times fewer stops). At the same time, the primary truck route may be longer (e.g., in the overall distance) than the secondary truck route. For example, warehouse and/or distribution centers are often located outside of city centers where space is more available and affordable. At the same time, the transfer locations do not require much space and can be even temporary (e.g., completed on a parking lot). As such, these transfer locations can be centrally located to various delivery routes, e.g., close to city centers.

Figure 1C:
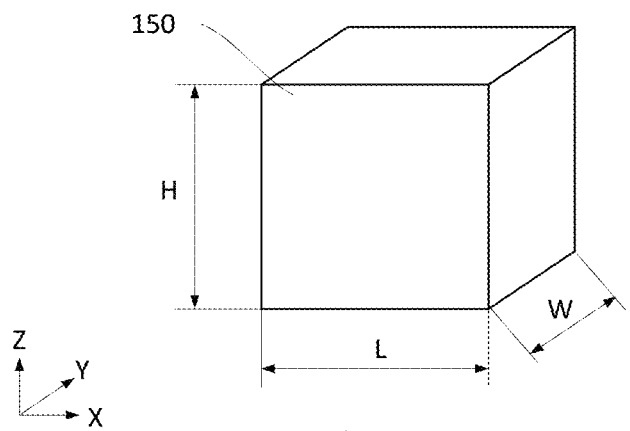
FIG. 1C is a schematic illustration of a cargo container, in accordance with some examples.
Figure 1D:
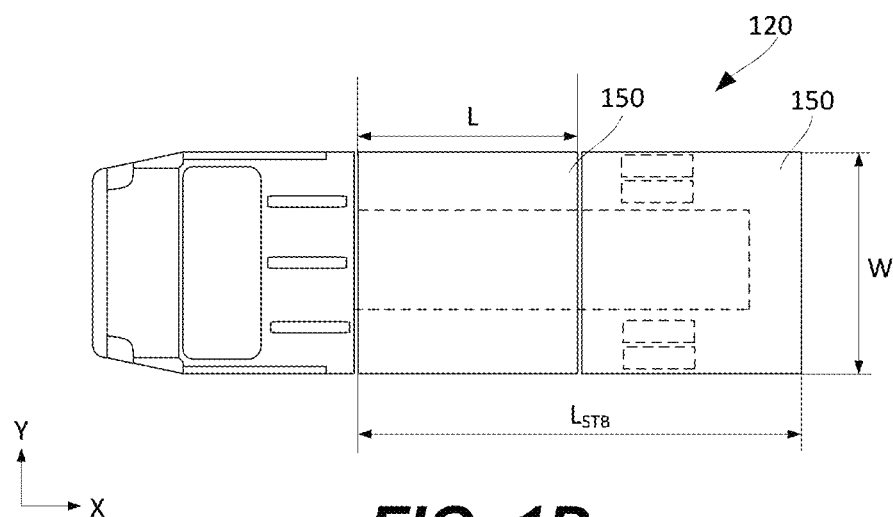
FIGS. 1D and 1E are schematic top and side views of a secondary truck carrying two cargo containers, in accordance with some examples.
Figure 1E:
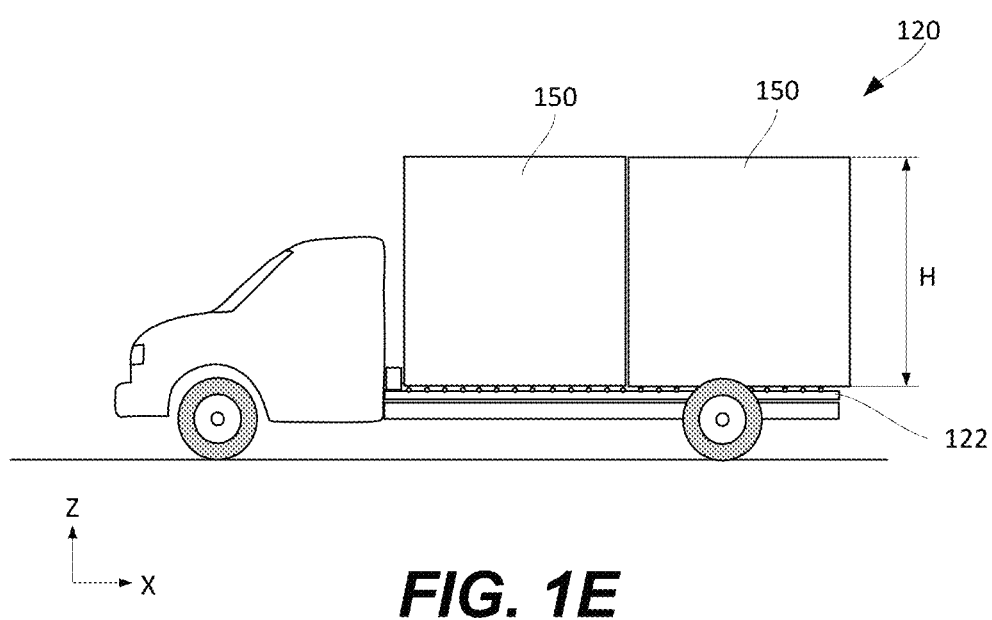

Referring to FIG. 1C, in some examples, cargo container 150 is specifically configured for space utilization while being transported on primary truck 110 and secondary trucks 120. For example, the cargo space available on primary truck 110 may be from 16 feet to 53 feet in length and/or from 6 feet to 9 feet in width. In the same or other examples, the cargo space available on secondary truck 120 may be from 12 feet to 28 feet in length and/or from 6 feet to 9 feet in width. A combination of these cargo space dimensions and the size of cargo container 150 determines the number of cargo containers 150 that each of primary trucks 110 and secondary trucks 120 can transport. In some examples, a portion of the truck bed area that is not utilized for supporting cargo containers 150 is less than 25% or even less than 10%. In other words, cargo containers 150, primary truck bed 112, and secondary truck bed 122 are specifically designed to maximize the truck bed utilization. The same concept applies to the height of cargo containers 150 as primary trucks 110 and secondary trucks 120 have height restrictions. FIGS. 1D and 1E are schematic top and side views of secondary truck 120 carrying two cargo containers 150, illustrating the container dimensions and the utilization of secondary truck bed 122. In this example, the length of secondary truck bed 122 (LSTB) allows to position two cargo containers 150 on secondary truck bed 122. Other examples are within the scope.

Referring to FIG. 1C, in some examples, the height (H) of cargo container 150 is from 3 feet to 9 feet, or more specifically, from 5 feet to 8 feet. In the same or other examples, the length (L) of cargo container 150 is from 3 feet to 8 feet, or more specifically, from 5 feet to 8 feet. Finally, the width (W) of cargo container 150 is from 3 feet to 8 feet, or more specifically, from 5 feet to 7 feet. In some examples, cargo container 150 is transferrable by a single person without any assistance or with the assistance of minimal non-powered portable devices, such as a dolly or alike. For example, the empty weight of cargo container 150 can be up to 400 kg or, more specifically, up to 300 kg or even up to 200 kg. The gross (loaded) weight of cargo container 150 can be up to 1,000 kg or, more specifically, up to 800 kg or even up to 600 kg. For comparison, the empty weight of a conventional 20-foot container is about 2,000 kg, while the empty weight of a conventional 40-foot container is about 4,000 kg. Clearly, conventional containers used for trucks (as well as ships and trains) are not transferrable by a single person and require special equipment, such as cranes or very large forklifts.

Figure 1F:
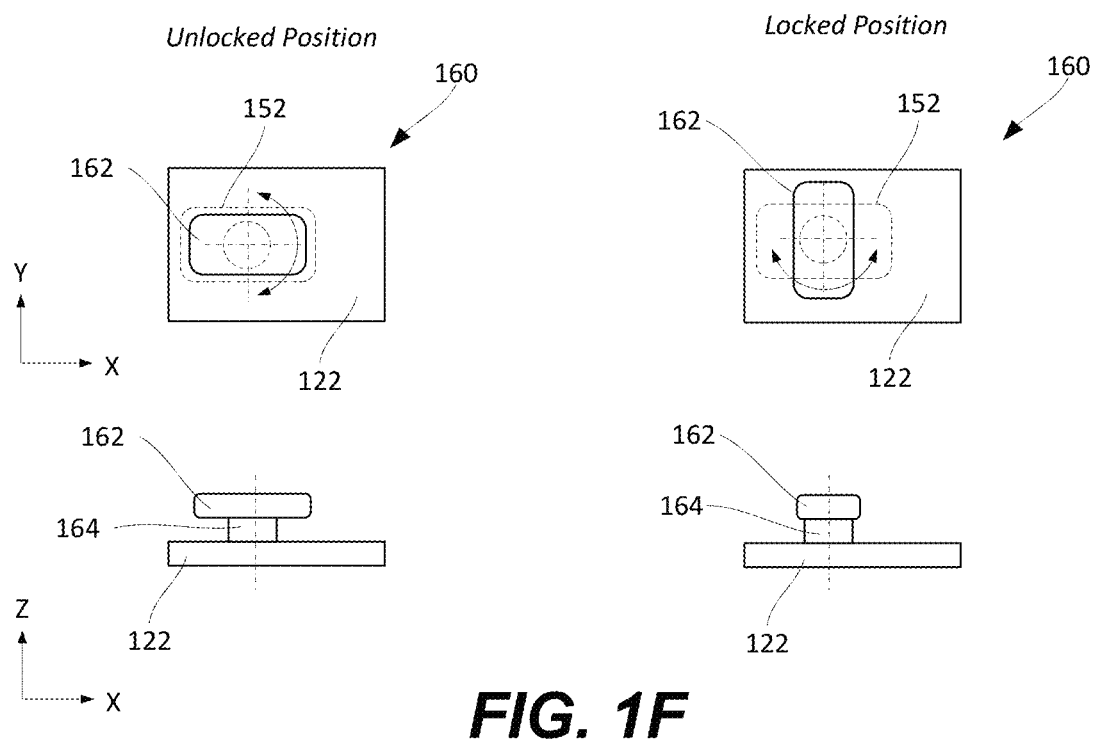
FIGS. 1F and 1G are schematic top and side views of different examples of retaining features for supporting cargo containers on primary and secondary trucks.
Figure 1G:
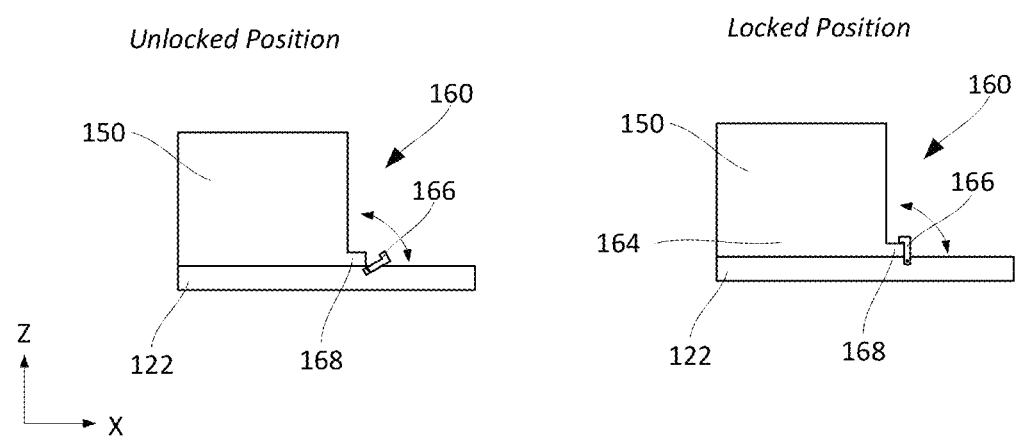

In some examples, cargo containers 150 or a truck bed (e.g., primary truck bed 112 and secondary truck bed 122) comprises retaining features 160. Two examples of retaining features 160 are shown in FIGS. 1F and 1G. In both examples, retaining feature 160 is attached to secondary truck bed 122. However, one having ordinary skill in the art would appreciate how this retaining feature 160 can be used on cargo containers 150 or primary truck bed 112. Referring to FIG. 1F, retaining feature 160 comprises head 162 and neck 164, rotatably coupling head 162 to neck 164. In an unlocked position, retaining feature 160 is turned in such a way that it is aligned and can protrude into opening 152 (which is a part of cargo container 150 in this example). The boundary of opening 152 is shown with a dashed line and this boundary is slightly larger than the footprint of head 162. Once head 162 protrudes into opening 152, head 162 is turned into a locked position, in which head 162 can not be extracted from opening 152. In this position, cargo container 150 is secured relative to secondary truck bed 122. Referring to FIG. 1G, retaining feature 160 comprises latch 166, pivotably coupled to secondary truck bed 122 and configured to engage corner 168 of cargo container 150.

In some examples, retaining features 160 are sublush with a top surface of the truck bed and/or with the bottom surface of cargo containers 150. In these examples, retaining features 160 extend above the corresponding surface during the latching operation (and stay in this extended orientation) while cargo container 150 is supported on the truck. Once retaining features 160 are unlatched, retaining features 160 can retract below the corresponding surface (e.g., into the retracted position).

Figure 1H:
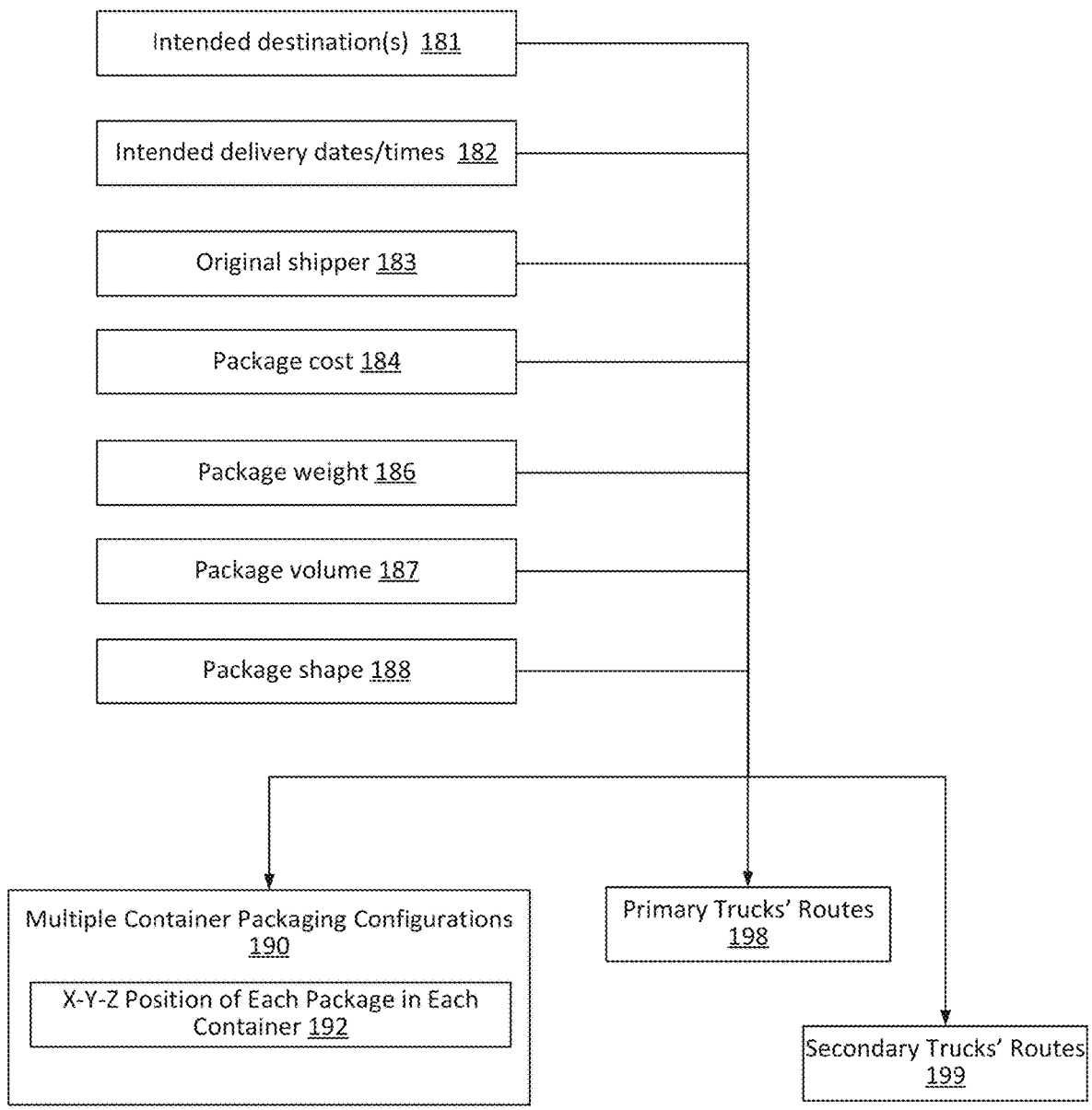
FIG. 1H is a block diagram of various factors used for determining container packaging configurations, primary trucks' routes, and/or secondary trucks' routes, in accordance with some examples.

FIG. 1H is a block diagram of various factors used for determining container packaging configurations 190 (including an X-Y-Z position of each package in each container 192), primary trucks' routes 198, and/or secondary trucks' routes 199, in accordance with some examples. In some examples, each cargo containers 150 comprises packages presorted according to one or more criteria selected from the group consisting of intended destinations 181, intended delivery dates/time 182, original shipper 183, package cost 184, package weight 186, package volume 187, and package shape 188. In some examples, packages are positioned (e.g., stacked) within cargo container 150 based on first-in-last-out system. In other words, the first package placed into cargo container 150 (and further away from the access opening, such as the door of cargo container 150) can be the last package delivered and vice versa. More specifically, any packages to be delivered first (e.g., based on intended delivery dates/time 182 or a combination of the route and intended destinations 181) are stacked near the top of cargo container 150, where these packages are easily accessible (e.g., by the driver of secondary truck 120). On the other hand, any packages to be delivered last can be positioned near the bottom of cargo container 150. The packages at the bottom of cargo container 150 will become accessible later in the day once the initial packages are delivered.

In some examples, packages are generally stacked in a manner described above, e.g., according to the delivery order. However, the package weight may be also taken into account to ensure that the packages at the container bottom are not crushed by heavier packages positioned at the top of cargo container 150. For example, any packages above a certain weight threshold can be placed within a set of bottom rows (e.g., bottom three rows) to avoid crushing lighter packages. Packages placed above the heavy package will then be additionally sorted so that they are removed before the heavy package. The heavy package may also be placed against a certain side of the container (for example closest to the door) so that the delivery driver does not need to lean far into the container to pick it up.

Figure 2A:
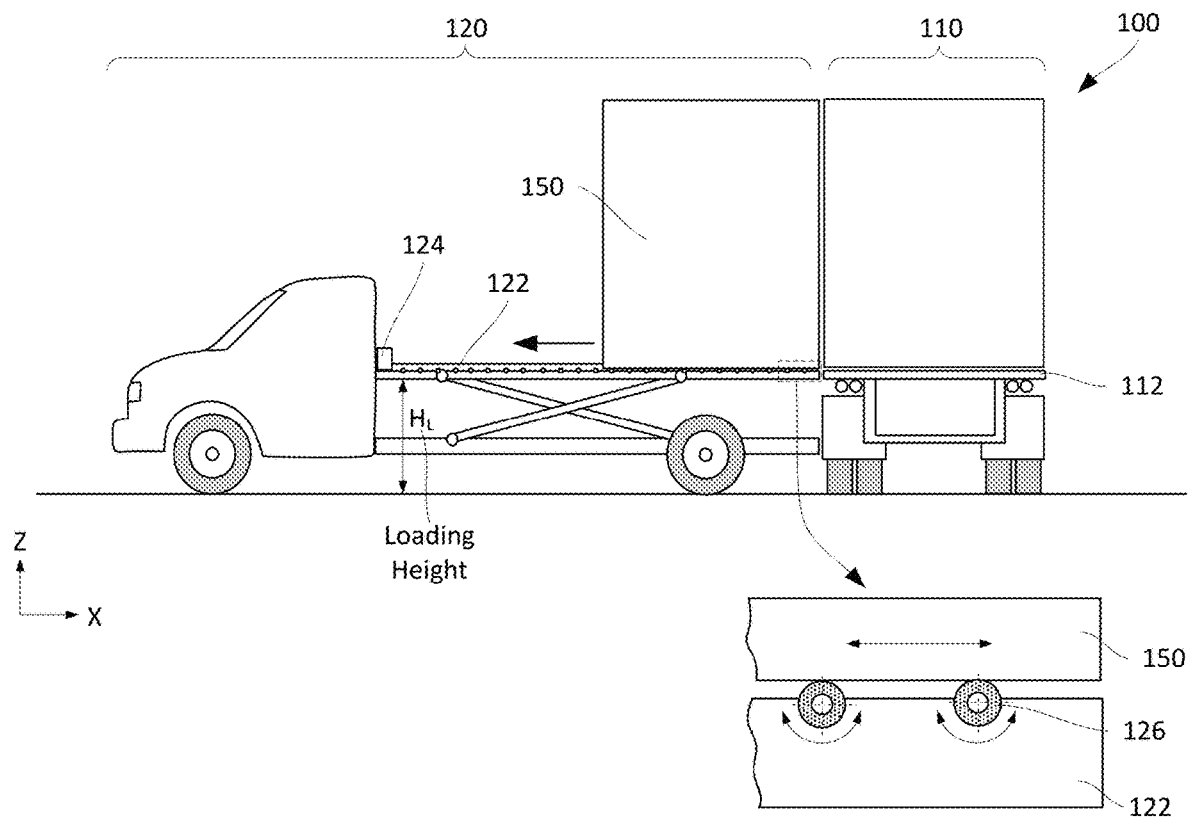
FIG. 2A is a schematic illustration of a primary truck and a secondary truck while transferring a cargo container from the primary truck to the secondary truck, in accordance with some examples.

FIG. 2A is a schematic illustration of primary truck 110 and secondary truck 120 while transferring cargo container 150 from primary truck 110 to secondary truck 120, in accordance with some examples. Specifically, primary truck 110 comprises primary truck bed 112, supporting cargo container 150 during the transportation and transfer. Similarly, secondary truck 120 comprises secondary truck bed 122, also supporting cargo container 150 during the transportation and transfer. In some examples shown in FIG. 2A, primary truck bed 112 and secondary truck bed 122 are coplanar during the transfer. This coplanar orientation helps with the transfer, e.g., eliminating the need for cranes or other lifting equipment. For example, cargo container 150 (or each of primary truck bed 112 and secondary truck bed 122) may be equipped with rollers enabling this transfer. FIG. 2A illustrates one example of rotatable container supports 126 integrated into secondary truck bed 122. The rotation of container supports 126 enables the axial movement of cargo container 150 on secondary truck bed 122. In some examples, similar container supports are integrated into secondary truck bed 122 and/or primary truck bed 112. Alternatively or additionally, a container bottom has rotatable supports. For example, a combination of two sets of rotatable supports enable moving cargo container 150 relative to secondary truck bed 122 and/or primary truck bed 112 in two directions thereby providing additional flexibility for transferring containers between trucks.

In some examples, secondary truck 120 is equipped with container transfer system 124, e.g., a winch. Container transfer system 124 can assist people with the container transfer or completely replace any physical actions requires from people (while the control aspects can be still performed by people). For example, the transfer may be activated by the drivers of primary truck 110 and secondary truck 120 (e.g., directly from their respective cabins) after primary truck 110 and secondary truck 120 are aligned relative to each other.

Figure 2B:
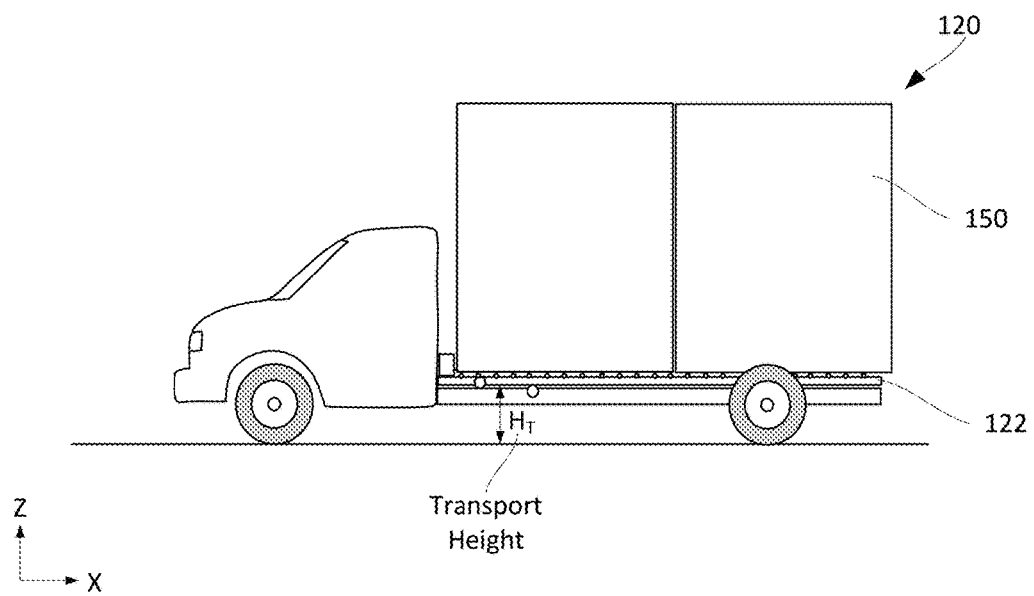
FIG. 2B is a schematic illustration of a secondary truck transporting two cargo containers, in accordance with some examples.
Figure 2C:
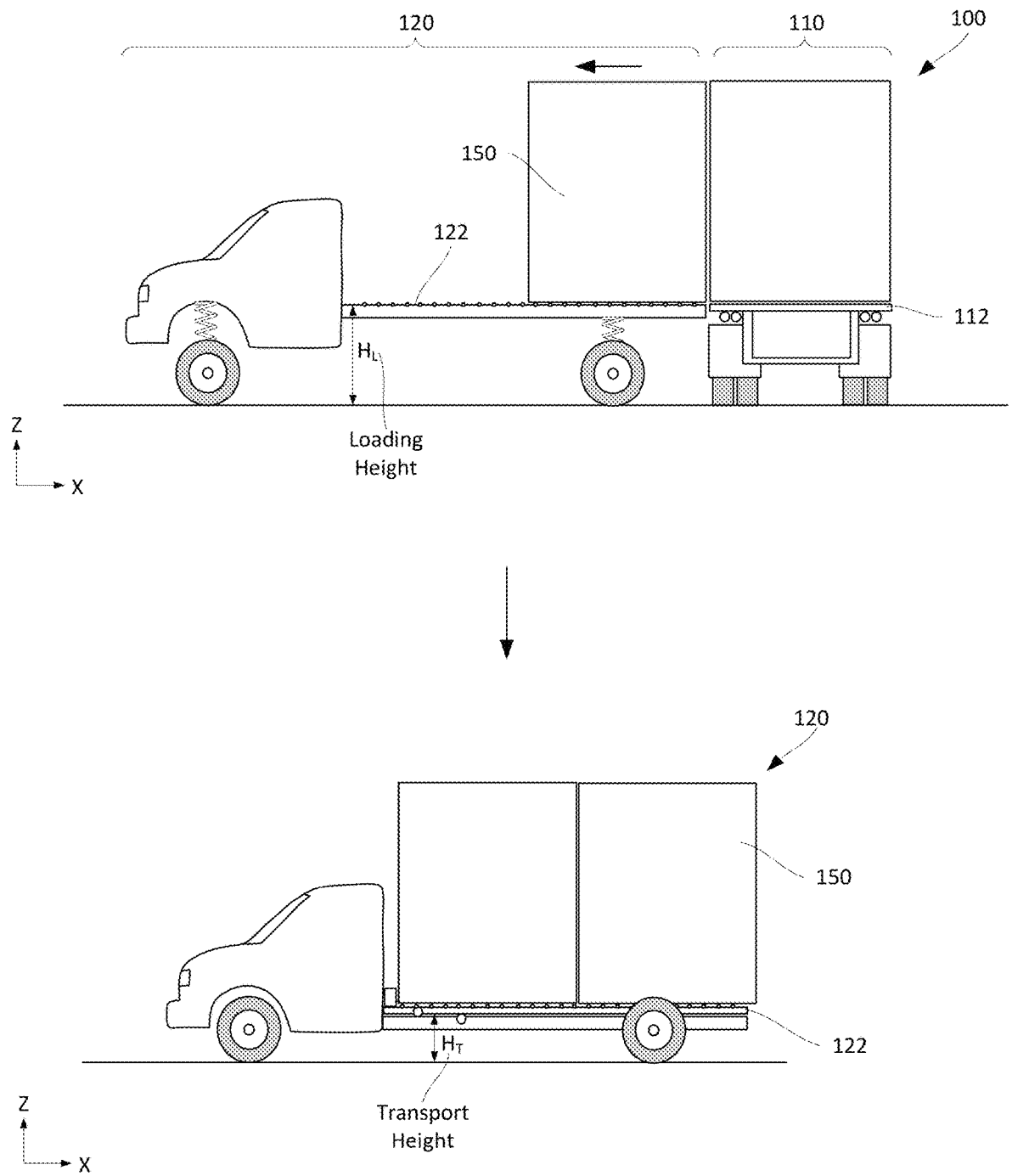
FIG. 2C is a schematic illustration of a secondary truck having an adjustable-height suspension for transferring a cargo container from the primary truck to the secondary truck at one suspension setting and for transporting two cargo containers at a different suspension setting, in accordance with some examples.
Figure 2D:
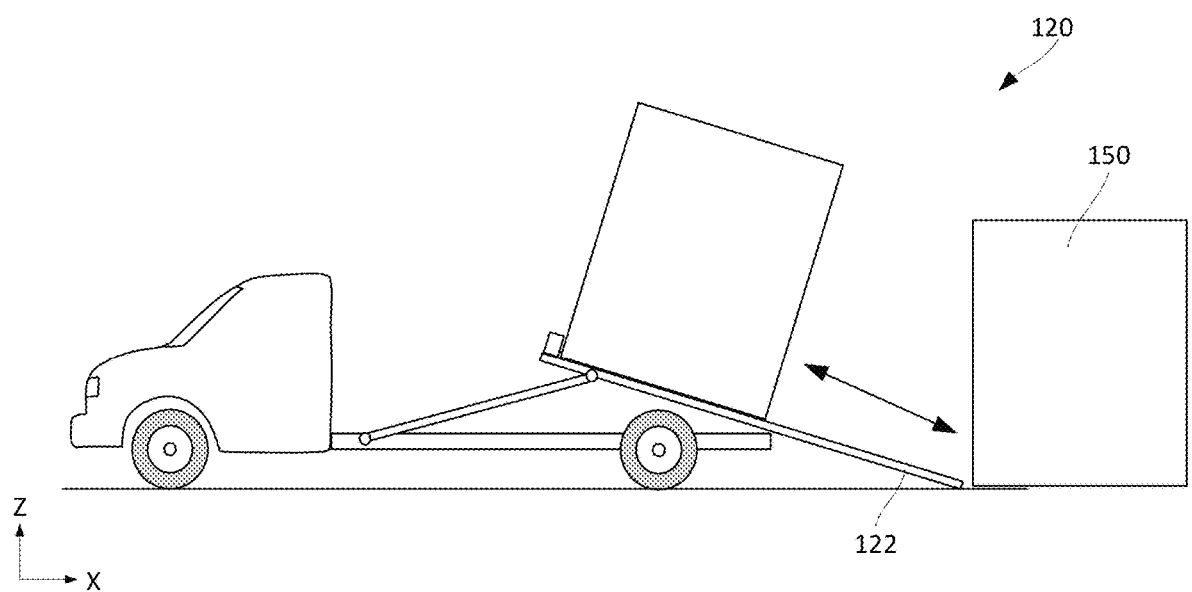
FIG. 2D is a schematic illustration of a secondary truck unloading a cargo container to the ground, in accordance with some examples.

In some examples, the height of secondary truck bed 122 is adjustable as, e.g., schematically shown in FIGS. 2A and 2B. For example, secondary truck bed 122 may be raised for the transfer (e.g., to ensure that primary truck bed 112 and secondary truck bed 122 are coplanar) and lowered for the transportation (e.g., to lower the center of gravity, to reduce the drag coefficient, and/to make cargo containers 150 more accessible to the delivery personnel while cargo containers 150 are positioned on secondary truck bed 122). Alternatively, the height of secondary truck bed 122 is adjusted as a part of the overall truck height adjustment, e.g., an adjustable suspension, e.g., as schematically shown in FIG. 2C. In some examples, secondary truck bed 122 is configured to tilt as, e.g., as schematically shown in FIG. 2D. For example, secondary truck bed 122 may be tilted for loading and unloading cargo containers 150 to the ground.

Various examples of cargo container 150 are within the scope. FIGS. 3A and 3B are schematic illustrations of stackable cargo containers 150, in accordance with some examples. The stackable configuration allows reducing the space occupied by cargo containers 150 when cargo containers 150 are empty. For example, primary truck 110 may be configured to transport eight full cargo containers 150. However, in a stacked container configured, primary truck 110 can transport a much higher number of empty cargo containers 150, e.g., 12 or more, 14 or more, 16 or more.

Figure 3E:
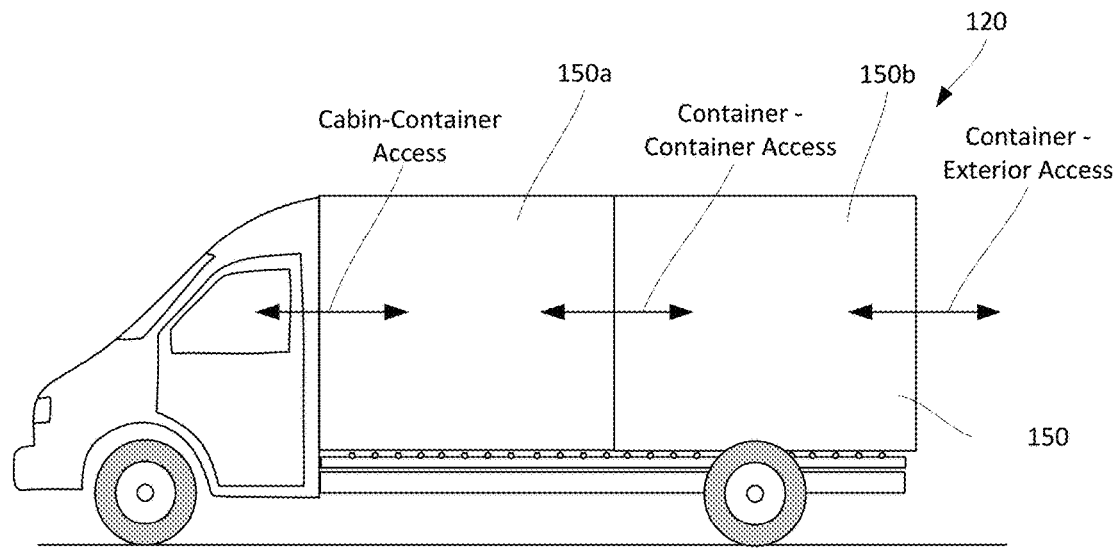
FIGS. 3E and 3F are side and top views of a secondary truck illustrating various access examples to the two cargo containers on this secondary truck.
Figure 3F:
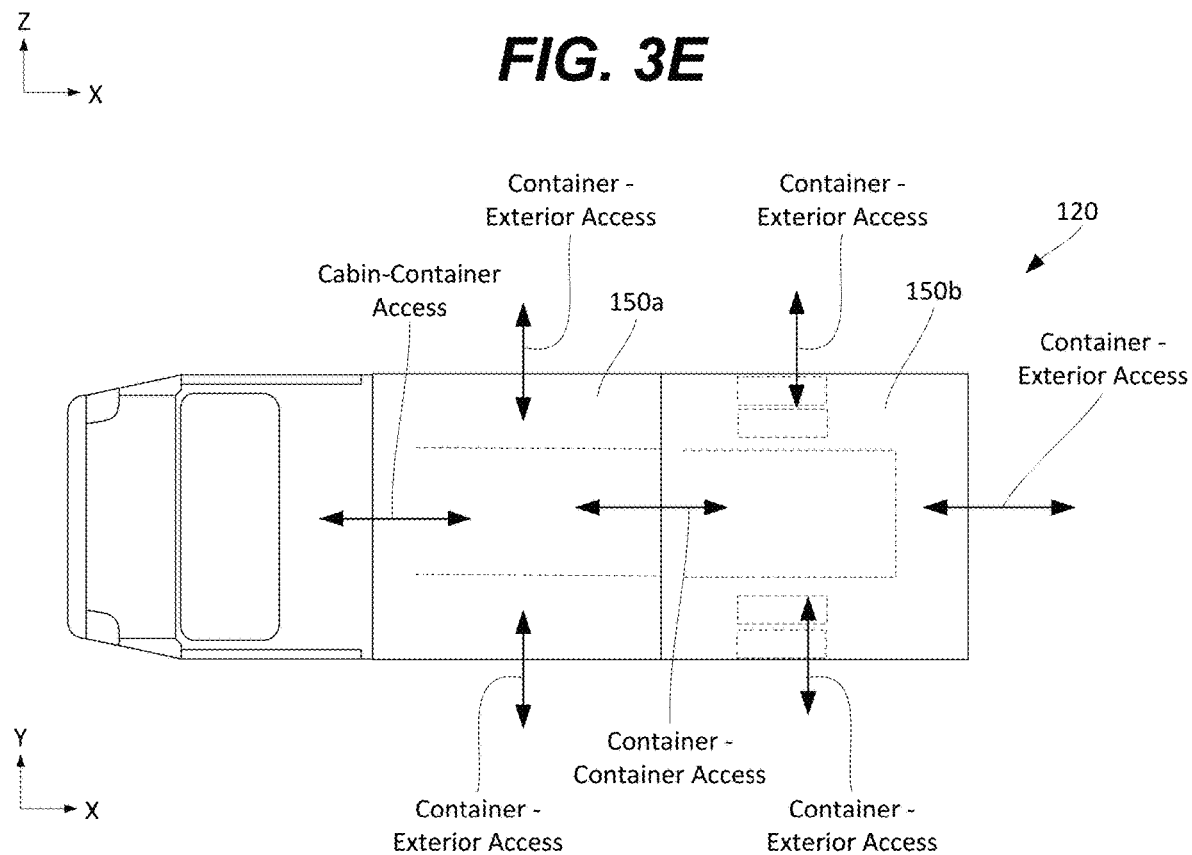

FIGS. 3C and 3D are schematic illustrations of collapsible cargo container 150 in an expanded state (FIG. 3A) and a collapsed state (FIG. 3B), in accordance with some examples. In these examples, the sidewalls of collapsible cargo container 150 can be folded and positioned over the bottom as, e.g., is schematically shown in FIG. 3D. FIGS. 3E and 3F are side and top views of secondary truck 120 illustrating various access examples to the two cargo containers (150a and 150b) on this secondary truck 120.

Examples of Cargo-Container Transport Methods

Figure 4:
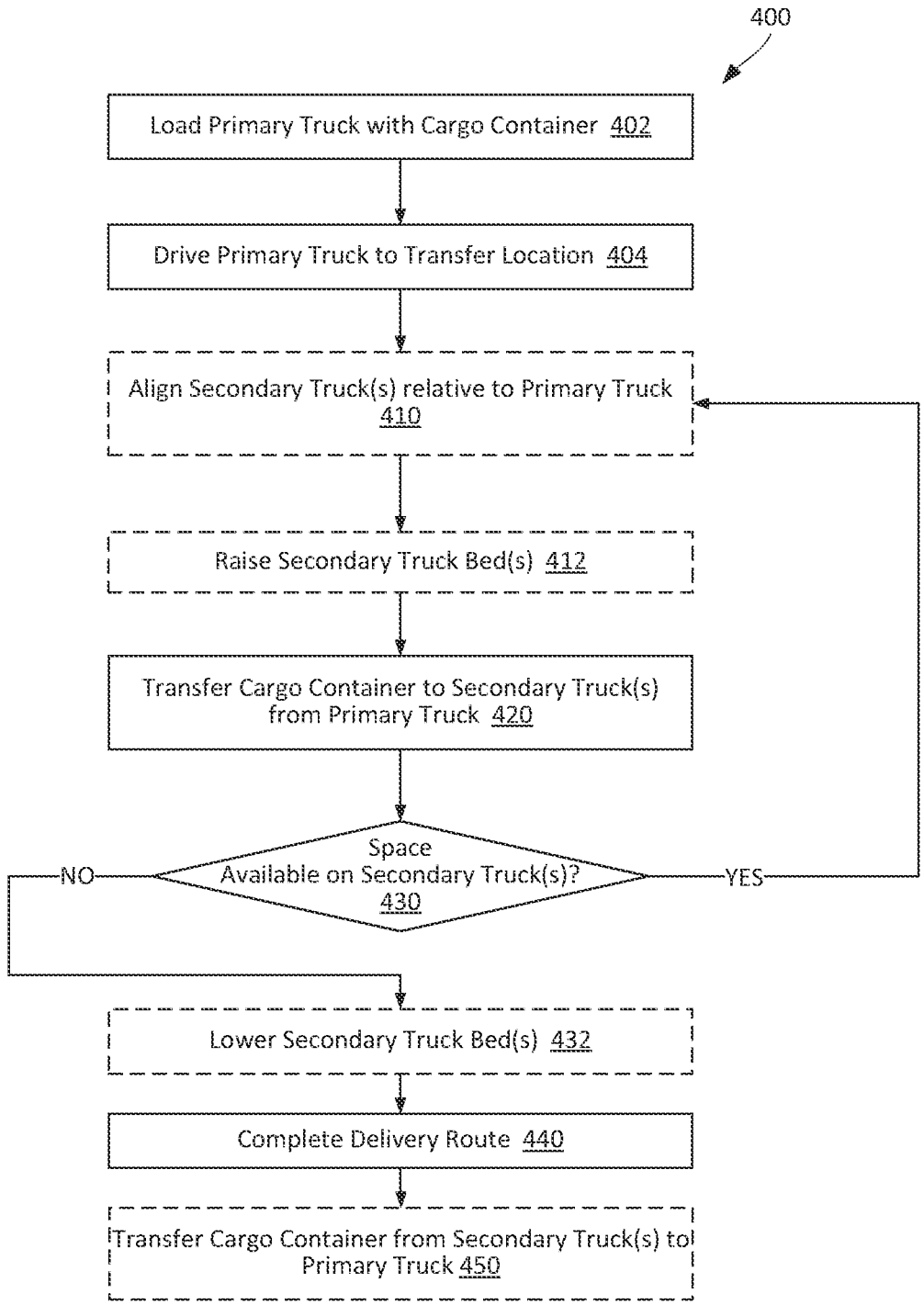
FIG. 4 is a process flowchart of a method for transporting cargo containers using primary trucks and secondary trucks, in accordance with some examples.

FIG. 4 is a process flowchart of method 400 for transporting cargo containers 150 using primary trucks 110 and secondary trucks 120, in accordance with some examples. Various examples of cargo containers 150, primary trucks 110, and secondary trucks 120 are described above.

In some examples, method 400 commences with loading (block 402) cargo containers 150 onto one or more primary trucks 110 (e.g., at a warehouse). Cargo containers 150 may be previously loaded with individual packages, each associated with a specific delivery location. Each cargo container 150 may be loaded such that all the delivery locations for all packages in this container are within the same area. Furthermore, the package may be loaded in accordance with the weight and fragility, e.g., heavier packages at the bottom, fragile packages at the top. In some examples, the packages may be loaded according to the delivery route, e.g., packages that are to be delivered first being positioned closer to the cargo container door, which may be also referred to as last-in/first-out container loading.

Method 400 proceeds with driving (block 404) primary trucks 110 to a transfer location. In some examples, transfer locations are specifically selected based on the final delivery routes, e.g., to minimize the distance traveled by secondary trucks 120. It should be noted that the operation of primary truck 110 (on the per-package level) is more efficient than that of secondary trucks 120. Some examples of a transfer location are parking lots (paved or unpaved), small warehouses, and streets. Effectively any location where primary truck 110 can be aligned relative to at least one secondary truck 120 to transfer containers can be used as a transfer location. Transfer locations can be permanently designated or flexibly allocated, e.g., different for different days, depending on the current delivery routes and packages.

Figure 5A:
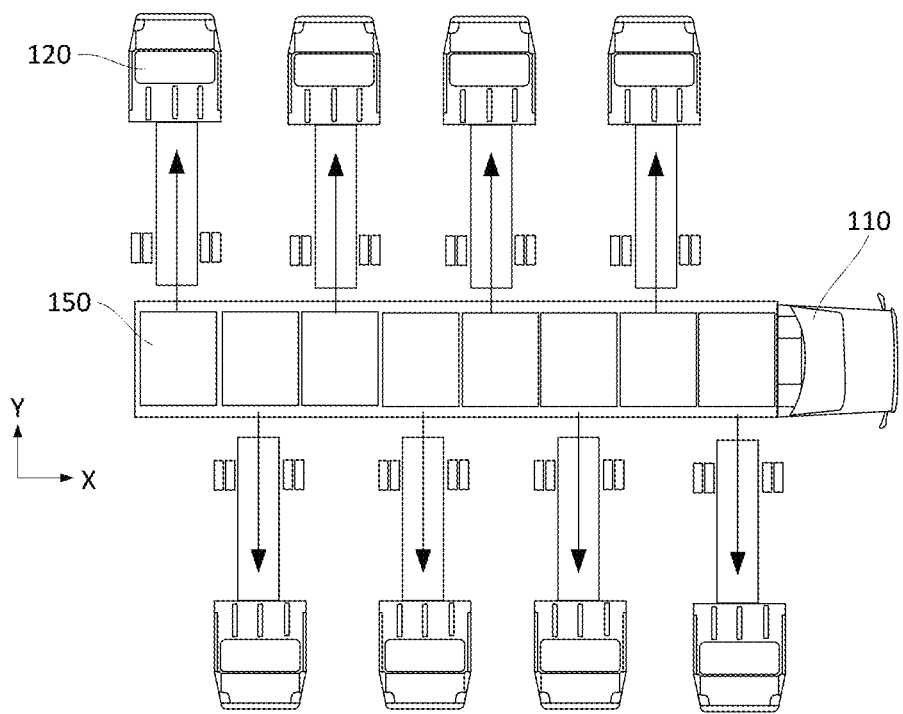
FIGS. 5A-5D are schematic illustrations of a cargo-container transport system at different stages of the method of FIG. 4, in accordance with some examples.

Method 400 proceeds with aligning (block 410) one or more secondary trucks 120 relative to primary truck 110. The alignment is performed such that each of one or more secondary trucks 120 is adjacent (e.g., perpendicular or axially aligned) to primary truck 110. One example is shown in FIG. 5A. At this stage, primary truck 110 is loaded with cargo containers 150, while secondary trucks 120 are empty.

In some examples, secondary trucks 120 may be pre-aligned before primary truck 110 arrives, e.g., based on specific markings at the transfer location. Furthermore, secondary trucks 120 may be preconfigured to receive specific cargo containers 150 from primary truck 110, e.g., secondary truck bed 122 raised, route maps (corresponding to specific cargo containers 150 transferred to this secondary truck) loaded.

In some examples, multiple secondary trucks 120 are aligned relative to primary truck 110 at the same time. For example, FIG. 5A illustrates eight secondary trucks 120 are aligned relative to one primary truck 110. The number of secondary trucks 120 that can be aligned relative to the same primary truck 110 depends on the length of primary truck 110, the width of each secondary truck 120, and availability of transferring from one or both sides. For example, FIG. 5A illustrates multiple trucks 120 being aligned on different sides of primary truck 110 at the same time (e.g., four on each side). Aligning multiple secondary trucks 120 allows expediting the transfer operations as multiple cargo containers 150 may be transferred to corresponding secondary trucks 120 at the same time.

Figure 6A:
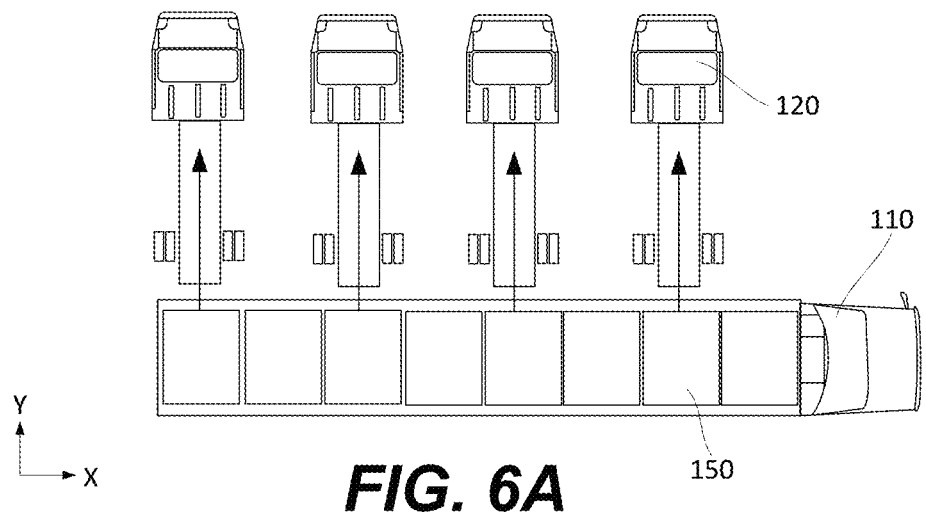
FIGS. 6A-6D are schematic illustrations of a cargo-container transport system at different stages of the method of FIG. 4, in accordance with some examples.
Figure 6B:
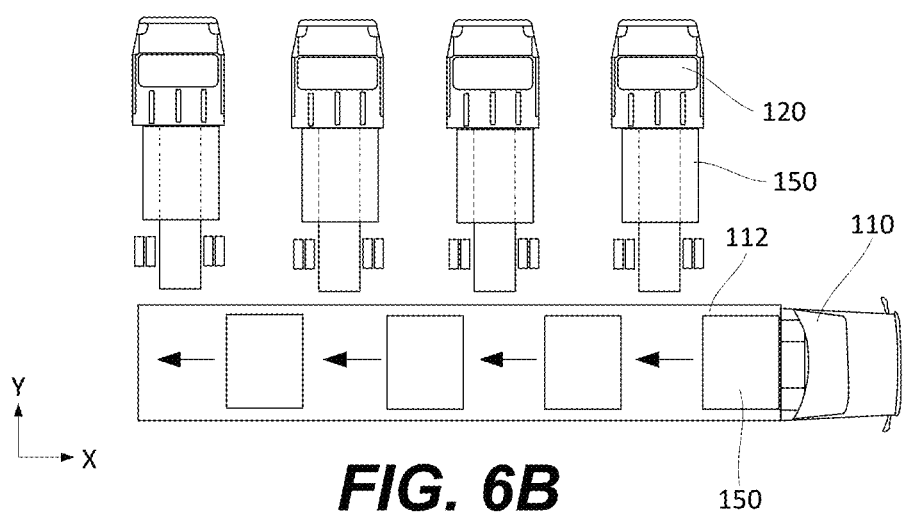
Figure 6C:
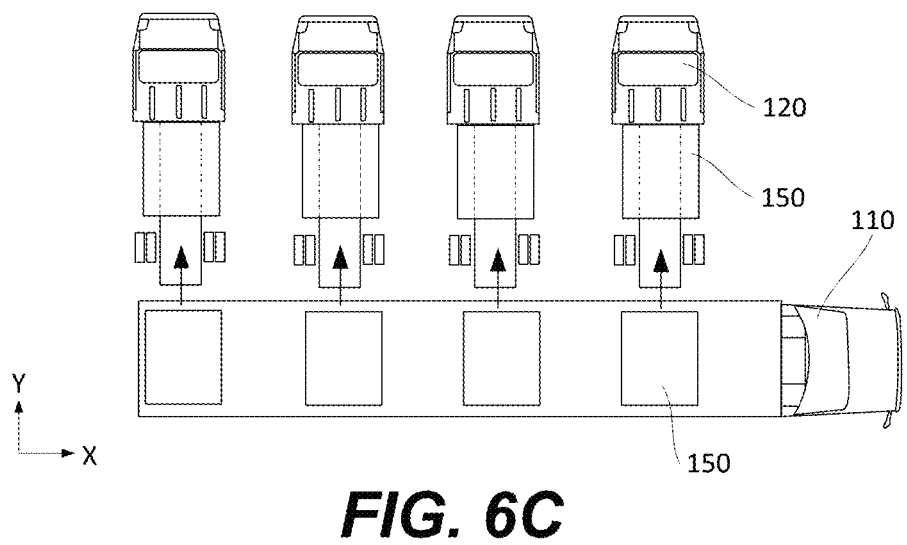
Figure 6D:
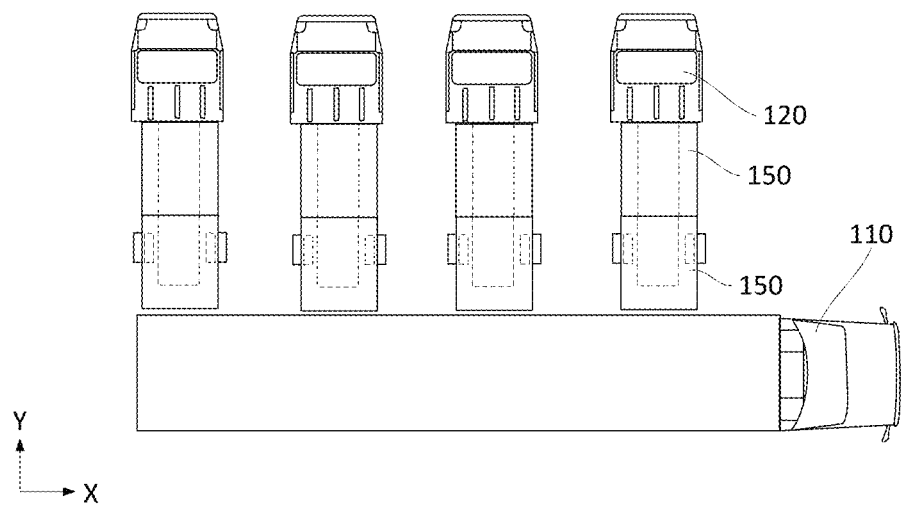

Referring to FIG. 6A-6D, in some examples, each secondary truck 120 is fully loaded without changing the orientation of secondary truck 120 relative to primary truck 110. Specifically, FIG. 6A illustrates four secondary trucks 120 aligned on one side of primary truck 110. The first set of cargo containers 150 is transferred from primary truck 110 to these four secondary trucks 120 (e.g., one cargo container 150 to each secondary truck 120) as, e.g., is schematically shown in FIG. 6B. Thereafter, the remaining cargo containers 150 are repositioned on primary truck 110 such that each of the remaining cargo containers 150 is aligned with one of secondary trucks 120 as, e.g., is schematically shown in FIG. 6C. For example, primary truck bed 112 or cargo containers 150 can be equipped with rollers or other devices enabling this operation. FIG. 6D illustrates remaining cargo containers 150 transferred onto secondary trucks 120 at which point, the transfer operation is completed.

Figure 7A:
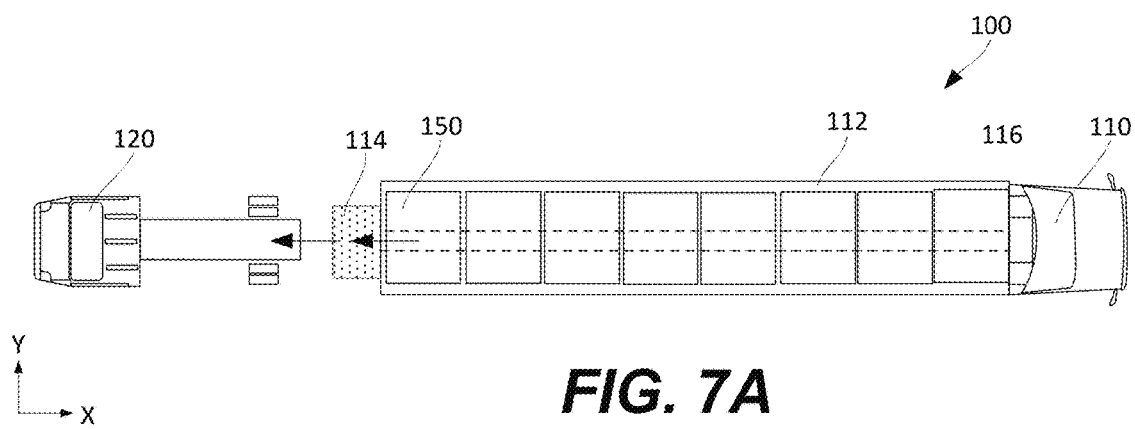
FIGS. 7A-7C are schematic illustrations of a cargo-container transport system at different stages of the method of FIG. 4, in accordance with other examples.
Figure 7B:
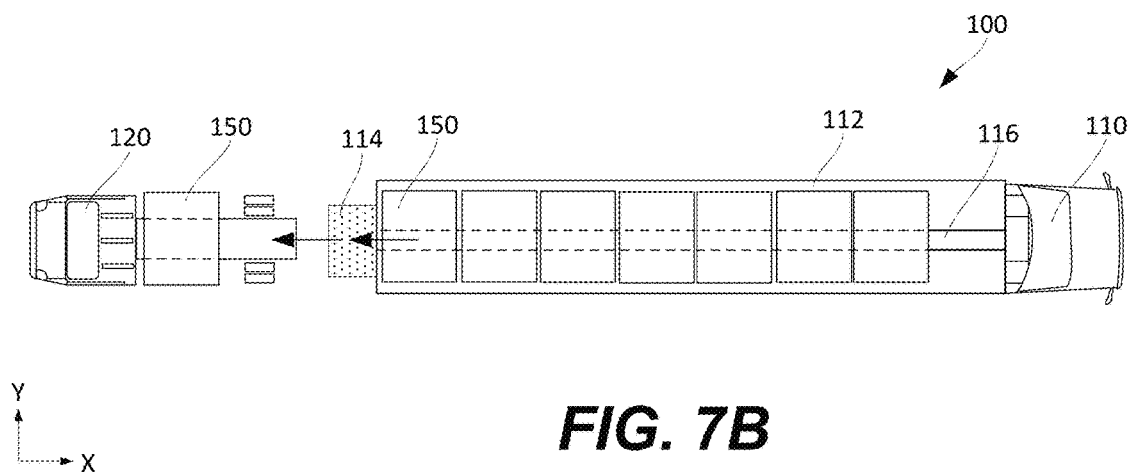
Figure 7C:
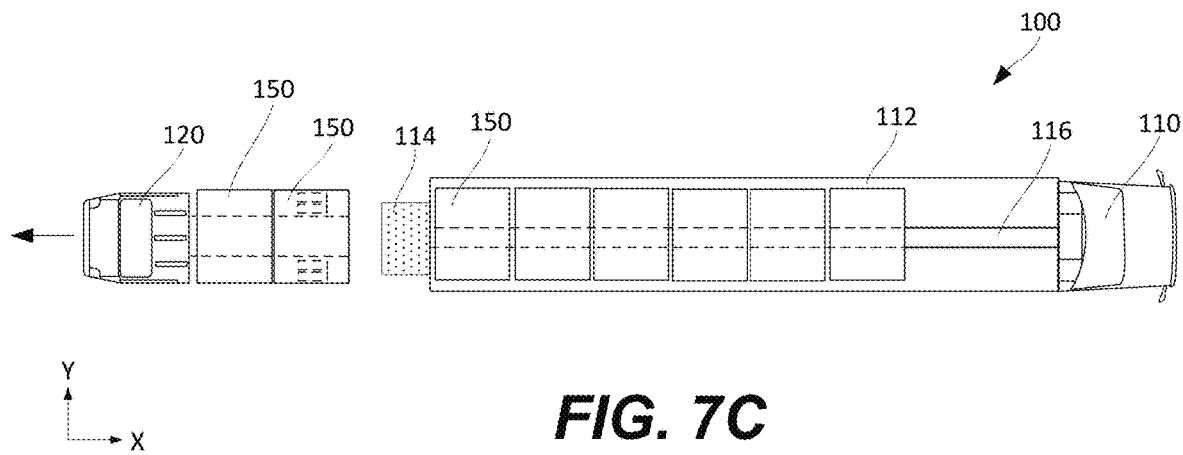

Referring to FIGS. 7A-7C, in some examples, one secondary truck 120 is axially aligned relative to primary truck 110, which may be also referred to as back-to-back alignment. In these examples, cargo containers 150 can be advanced on secondary truck bed 122 for loading to secondary truck 120. For example, FIGS. 7A-7C illustrates loading two cargo containers 150 on the same secondary truck 120 without a need for realignment of primary truck 110 and secondary truck 120. After one secondary truck 120 is loaded, another secondary truck 120 is aligned in the same manner relative to primary truck 110, and remaining cargo containers 150 are advanced on secondary truck bed 122.

Figure 8:
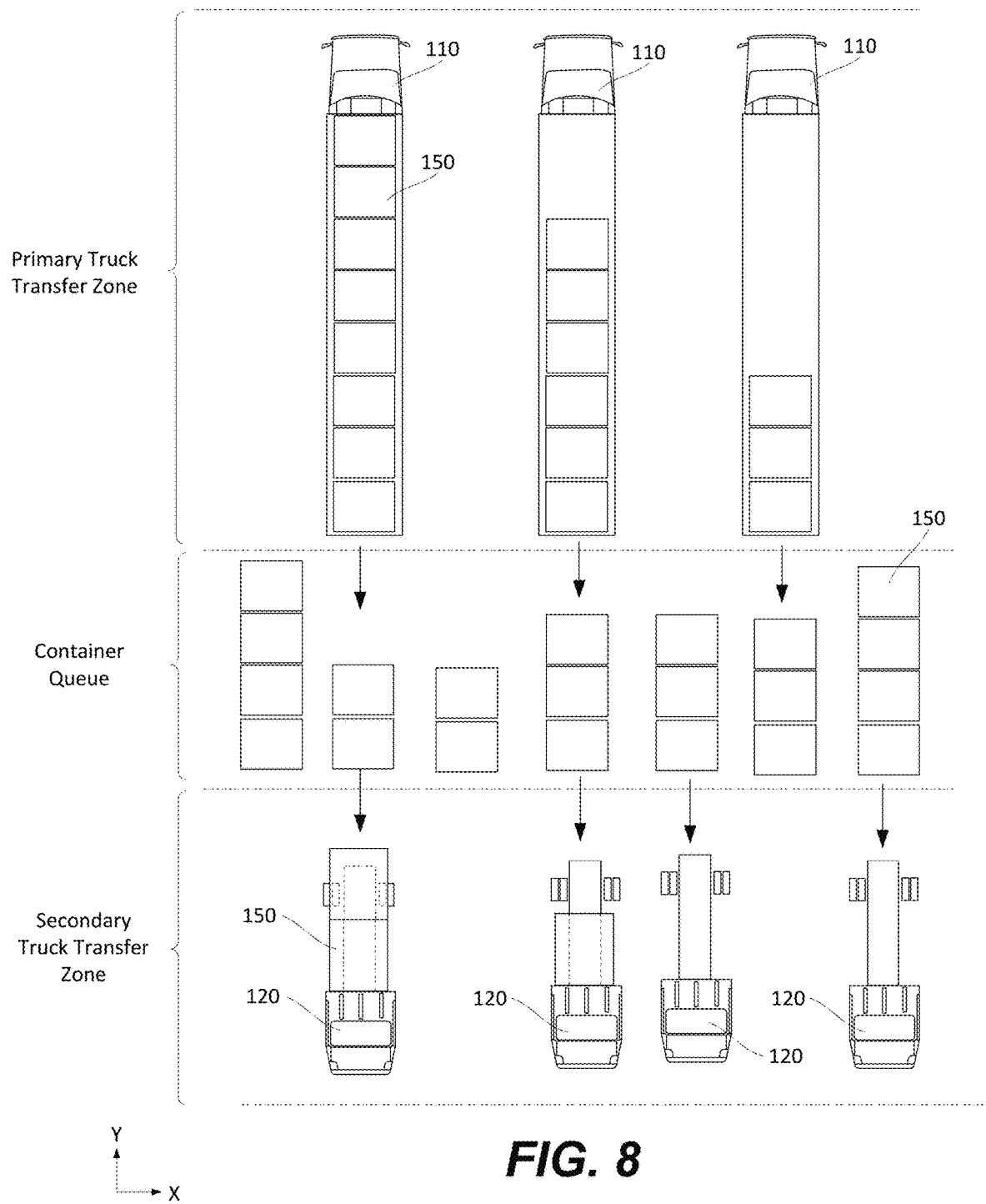
FIG. 8 is a schematic illustration of a cargo-container transport system corresponding to the method of FIG. 4, in accordance with other examples.

Referring to FIG. 8, in some examples, cargo containers 150 are removed from primary truck 110 without being directly transferred to any secondary trucks 120. For example, cargo containers 150 can be temporarily queued in a container storage zone In some examples, method 400 comprises raising (block 412) secondary truck bed 122 of one or more secondary trucks 120 such that secondary truck bed 122 is coplanar with a primary truck bed 112 of primary truck 110. Some aspects of this operation are described above with reference to FIGS. 2A, 2B, and 2C. This operation may be performed after aligning one or more secondary trucks 120 or before this aligning (e.g., if the height of primary truck bed 112 is known ahead of time). In either case, this operation is performed before transferring at least one of cargo containers 150. This operation is optional. In some examples, cargo containers 150 are transferred between primary truck 110 and secondary truck 120 with respective trucks beds not being coplanar. For example, primary truck bed 112 can be higher than secondary truck bed 122 during the transfer. As noted above, primary truck 110 can be equipped with transfer device 114 (e.g., a vertically movable platform) as shown in FIGS. 7A-7C, which enables the transfer. In some examples, transfer device 114 is specially configured for automated transfer of cargo containers 150 between primary truck 110 and secondary truck 120 (e.g., with minimal or no human controls).

Figure 5B:
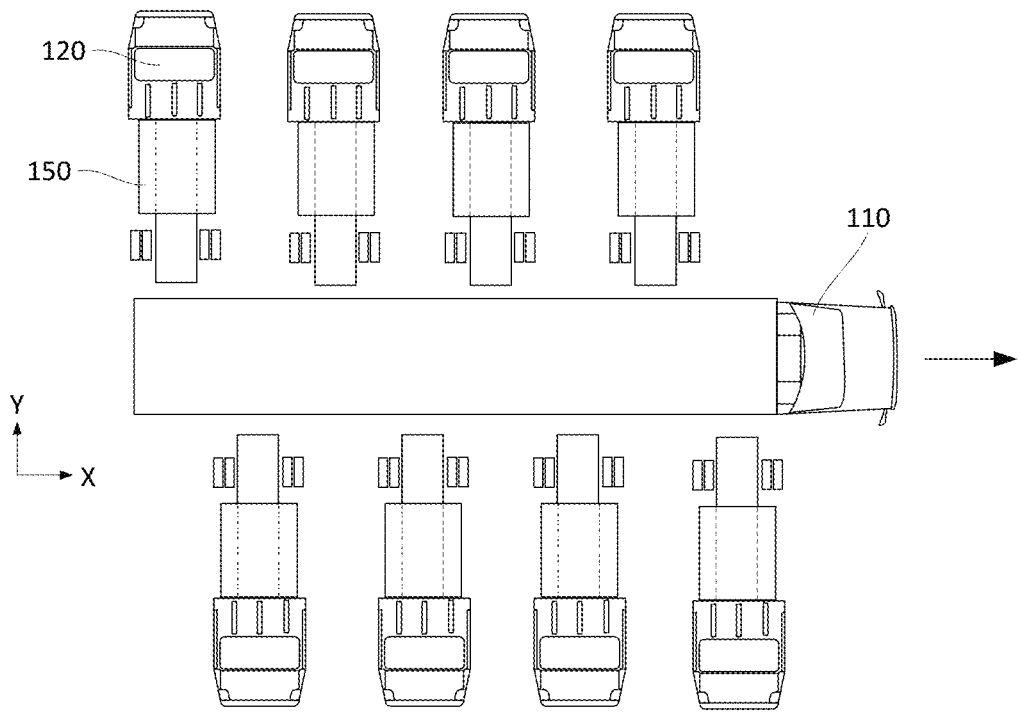
Figure 5C:
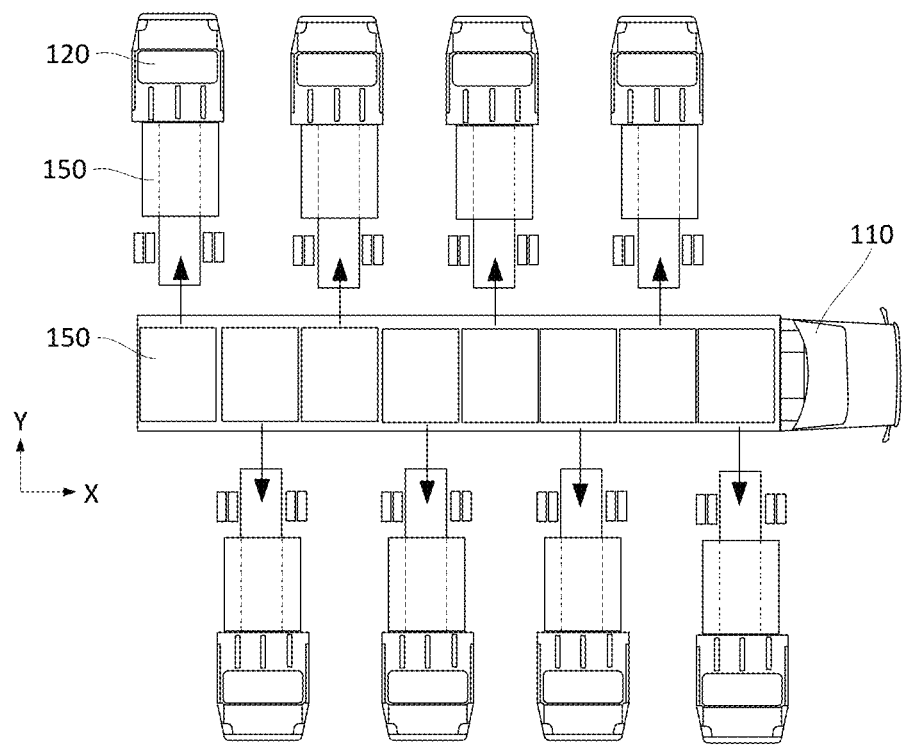
Figure 5D:
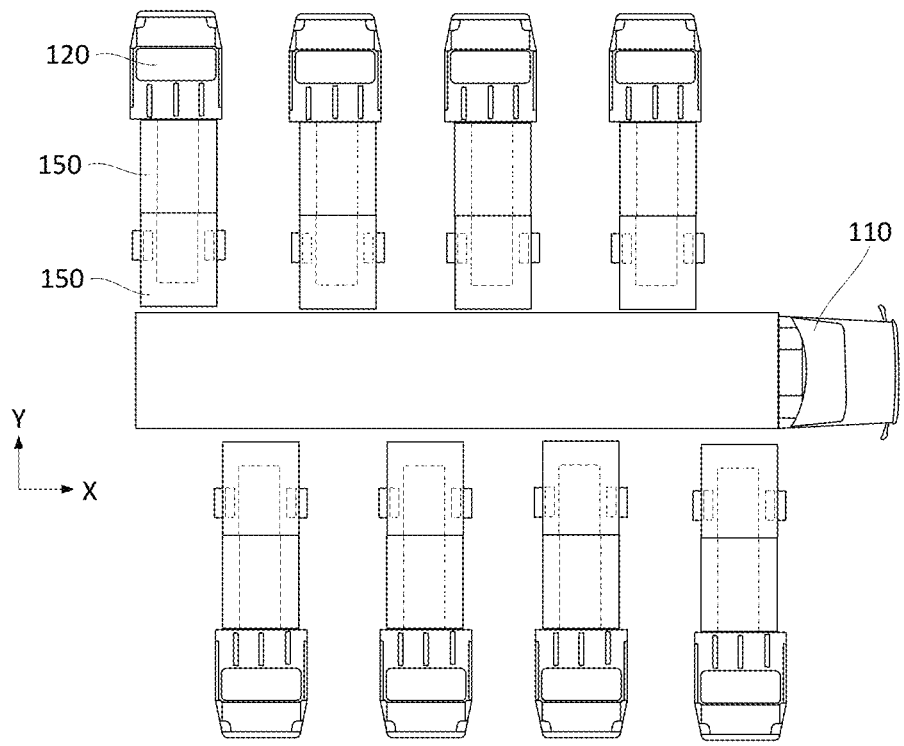

Method 400 proceeds with transferring (block 420) at least one of cargo containers 150 to each of one or more secondary trucks 120 from primary truck 110, e.g., as schematically shown in FIG. 5B. Method 400 proceeds with checking (decision block 430) if any secondary trucks 120 need additional containers. If additional containers are needed and primary truck 110 is empty, primary truck 110 may drive away. At this point, secondary trucks 120 may retain their configuration and wait for another primary truck to load additional containers as, e.g., is schematically shown in FIGS. 5C and 5D. Alternatively, the same secondary truck 120 may receive multiple containers from the same primary truck 110, e.g., by repositioning and aligning secondary truck bed 122 to another container, e.g., as described above with reference to FIGS. 5A-5D. In the same or other examples, secondary truck 120 may receive multiple containers from the same primary truck 110 by repositioning cargo containers 150 on primary truck bed 112, e.g., as described above with reference with reference to FIGS. 6A-6D and/or FIGS. 7A-7C. More specifically, in some examples, cargo containers 150 are configured to slide along the length and/or width of primary truck 110. This feature eliminates the need to reposition secondary truck 120 relative to primary truck 110.

In some examples, method 400 comprises lowering (block 432) secondary truck bed 122 of one or more secondary trucks 120 such that secondary truck bed 122 is lower than primary truck bed 112. This operation is performed after transferring at least one of cargo containers 150 to secondary truck bed 122 and schematically shown in FIGS. 2A and 2B.

Method 400 proceeds with completing (block 440) the delivery route. In specific examples, this operation involves driving one or more secondary trucks 120 away from primary truck 110 while secondary truck bed 122 is lower than primary truck bed 112.

Method 400 proceeds with transferring (block 450) cargo containers 150 from secondary trucks 120 to primary truck 110, which is an optional operation. For examples, cargo containers 150 can be collected at a distribution center throughout the day, e.g., transferred from each secondary trucks 120 to a collection point. These collected cargo containers 150 can be then send back to the primary warehouse (e.g., at the end of the day) either on primary truck 110 or one of secondary trucks 120 (e.g., in a stacked/collapsed configuration). In some examples, cargo containers 150 are stacked or collapsed on primary truck 110 after this transfer operation.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for transporting cargo containers comprising a first container set and a second container set, the method comprising:
   aligning secondary trucks relative to a primary truck comprising a primary truck bed such that each of the secondary trucks is adjacent and perpendicular to the primary truck and aligned with one container in the first container set, wherein:
      each of the secondary trucks comprises a secondary truck bed and an adjustable suspension connecting wheels to a frame;
      at least one container in the first container set is positioned between two containers in the second container set, and
      at least one container in the second container set is positioned between two containers in the first container set, and
   raising the frame of each of the secondary trucks relative to ground such that the secondary truck bed of each of the secondary trucks is coplanar to the primary truck bed; and
   transferring the first container set to the secondary trucks from the primary truck along a first direction;
   after transferring the first container set to the secondary trucks, repositioning the second container set on the primary truck bed, wherein:
      during repositioning, each container in the second container set is moved on the primary truck bed in a second direction, perpendicular to the first direction, and
      after repositioning, each container in the second container set is aligned with one of the secondary trucks; and
   transferring the second container set to the secondary trucks from the primary truck along the first direction.

2. The method of claim 1, further comprising, after transferring the second container set:
   lowering the frame of each of the secondary trucks such that the secondary truck bed of each of the secondary trucks is lower than the primary truck bed, and
   driving the secondary trucks away from the primary truck while the secondary truck bed of each of the secondary trucks is lower than the primary truck bed.

3. The method of claim 1, wherein the cargo containers are sized based on maximum allowable dimensions for the primary truck and further based on maximum allowable dimensions for each of the secondary trucks thereby ensuring maximum container capacity while the cargo containers are transported on the primary truck and, separately, while the cargo containers are transported on the secondary trucks.

4. The method of claim 1, wherein each of the cargo containers has:
   a height from 3 feet to 9 feet,
   a length from 3 feet to 8 feet, and
   a width from 3 feet to 8 feet.

5. The method of claim 1, wherein:
   each of the cargo containers comprises rotatable container supports, and
   the rotatable container supports enable rolling of the cargo containers relative to the primary truck and, separately, relative to each of the secondary trucks in at least one direction.

6. The method of claim 1, wherein:
   each of the secondary trucks comprises a container transfer system, and
   transferring the first container set to the secondary trucks and transferring the second container set to the secondary trucks are performed using the container transfer system of each of the secondary trucks.

7. The method of claim 1, wherein:
   transferring the first container set to the secondary trucks comprises transferring one container of the first container set to each of the secondary trucks; and
   transferring the second container set to the secondary trucks comprises transferring one container of the second container set to each of the secondary trucks.

8. The method of claim 1, wherein, after transferring the first container set to the secondary trucks and transferring the second container set to the secondary trucks, each of the secondary trucks has two of the cargo containers arranged in one row along the first direction.

9. The method of claim 1, wherein the first container set and the second container set are arranged in one row along the second direction.

10. The method of claim 1, wherein the secondary trucks are aligned on one side of the primary truck.

11. The method of claim 10, wherein the secondary trucks are spaced apart by about a width of the cargo containers, measured along the second direction.

12. The method of claim 1, wherein raising the frame of each of the secondary trucks relative to the ground is performed after the secondary trucks are aligned relative to the primary truck.

13. The method of claim 1, wherein raising the frame of each of the secondary trucks relative to the ground is performed before the secondary trucks are aligned relative to the primary truck.

14. The method of claim 1, wherein transferring the first container set to the secondary trucks and transferring the second container set to the secondary trucks are performed while the secondary trucks remain aligned relative to the primary truck.

15. The method of claim 1, wherein transferring the first container set to the secondary trucks and transferring the second container set to the secondary trucks are performed while the frame of each of the secondary trucks remains raised relative to the ground.

16. The method of claim 1, wherein the secondary truck bed of each of the secondary trucks has a length equal to two lengths of the cargo containers measured along the first direction.

17. The method of claim 1, wherein the secondary truck bed of each of the secondary trucks comprises retaining features configured to engage two of the cargo containers positioned on the secondary truck bed of each of the secondary trucks.

18. The method of claim 17, wherein:
   each of the retaining features comprises a head and a neck, rotatably coupling the head to the secondary truck bed of each of the secondary trucks,
   the head is configured to rotate between a locked position and an unlocked position,
   the head, in the unlocked position, is configured to protrude into an opening of one of the cargo containers, and
   the head, in the locked position, is configured to engage the one of the cargo containers while protruding into the opening.

19. The method of claim 17, wherein each of the retaining features comprises a latch, pivotably coupled to the secondary truck bed of each of the secondary trucks and configured to engage a corner of one of the cargo containers.

20. The method of claim 17, wherein the retaining features are sub-flush with a top surface of the secondary truck bed of each of the secondary trucks.

\* \* \* \* \*